United States Patent [19]

Frankiewicz

[11] 4,265,636

[45] May 5, 1981

[54] USE OF FORMALDEHYDE AS A CHEMICAL EMBRITTLING AGENT FOR WASTE

[75] Inventor: Theodore C. Frankiewicz, Westminster, Calif.

[73] Assignee: Occidental Research Corporation, Irvine, Calif.

[21] Appl. No.: 59,873

[22] Filed: Jul. 23, 1979

[51] Int. Cl.$^3$ .............................................. C10L 9/02
[52] U.S. Cl. ...................................... 44/1 C; 44/1 D; 423/DIG. 18
[58] Field of Search ............... 44/1 R, 1 D, 1 F, 1 C; 423/DIG. 18

[56] References Cited

U.S. PATENT DOCUMENTS

| | | | |
|---|---|---|---|
| 1,554,462 | 9/1925 | Prescott et al. | 44/16 R |
| 3,961,913 | 6/1976 | Brenneman et al. | 44/1 D |
| 4,008,053 | 3/1977 | Brenneman et al. | 44/1 D |

OTHER PUBLICATIONS

Investigation of Advanced Thermal-Chem. Concepts for Obtaining Improved MSW-Derived Products--EPA-600/7-78-143.

*Primary Examiner*—Carl F. Dees

[57] ABSTRACT

The instant invention relates to a method of converting the solid organic fraction of solid waste into a powdered fuel which comprises heating said solid organic fraction in the presence of formaldehyde for a time and at a temperature sufficient to embrittle said solid organic fraction, comminuting said embrittled solid organic fraction to a powder which is less than a predetermined particle size, and recovering said powder.

The solid organic fraction may be separated from the solid waste prior to treatment by the process of this invention or alternatively the solid waste can be treated by the method of this invention and the embrittled organic fraction separated therefrom. Formaldehyde may be added to the solid organic fraction as an aqueous solution, a gas, or solid, e.g. as paraformaldehyde. The embrittling process takes place at a temperature of at least 125° C., preferably from 150° C. to 250° C. and said embrittled solid organic fraction is preferably comminuted to a predetermined particle size of less than 10 mesh.

17 Claims, 1 Drawing Figure

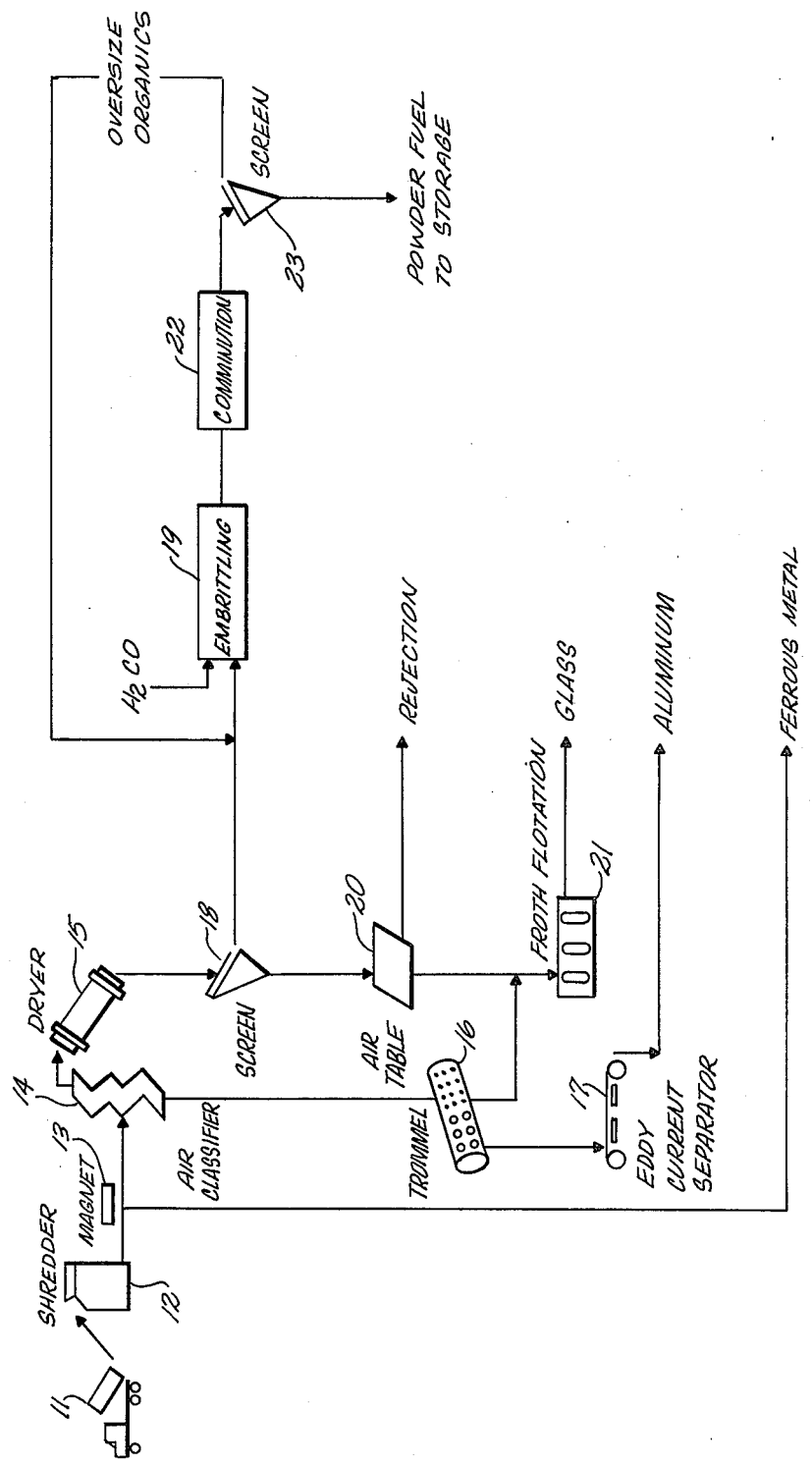

USE OF FORMALDEHYDE AS A CHEMICAL EMBRITTLING AGENT FOR WASTE

BACKGROUND OF THE INVENTION

1. Field of the Invention

The instant invention relates to making a usable powdered fuel from municipal or other solid waste sources by embrittling the solid organic fraction of said waste at elevated temperatures and in the presence of formaldehyde. After embrittlement, the embrittled solid organic fraction is comminuted, e.g. by grinding, to less than a predetermined particle size and a powdered fuel having a high caloric value is removed. The powdered fuel may be used as is or can be cofired with other fuels such as heating oils or coal.

2. Description of the Prior Art

Many processes for the reclamation of various valuable materials from waste sources are known. For example, municipal solid waste may be a source of aluminum, ferrous metals, glass, plastics, paper and textiles.

In an exemplary process for the separation of valuable materials from solid waste sources, the incoming waste is shredded to reduce the waste to easily handled particle size, e.g. less than 4 inches. The shredded waste may be passed through a magnetic field to remove ferrous metals and subjected to air-classification to separate the lighter materials, such as the various organics present in the waste, from the heavier materials such as glass, rock, dirt, etc. The heavier materials may be further treated to remove the electroconductive, non-magnetic metals, e.g. aluminum fragments by processes that rely on the electroconductive nature of aluminum to separate it from admixture with other materials. The glass may be recovered by froth flotation processes. Finally, the lighter materials from the air-classification may be burned to provide heat or pyrolyzed to provide gaseous or liquid products. In general, the objective of municipal waste treatment processes is to recover all valuable materials and minimize the amount of said waste that must be disposed of as landfill.

In a process described in U.S. Pat. Nos. 3,961,913 and 4,008,053, the solid organic fraction of municipal waste or other waste is converted into a powdered fuel. In the process described in these patents a mineral acid is used to embrittle the organic fraction and said embrittled organic fraction is then ground to a powdered fuel. The difficulty inherent in this process is that the mineral acids such as hydrochloric acid or surphuric acid, while efficient for embrittling the solid organic fraction, leave various undesirable moieties in the powdered fuel. For example, fuel derived from the solid organic fraction of municipal solid waste is, in and of itself, very low in sulphur. When sulphuric acid, however, is utilized as the embrittling agent in the above process, significant amounts of sulphur remains in the powdered fuel that is recovered. It is known in the art that the burning of sulphur containing fuels is undesirable from an environmental standpoint.

The use of hydrochloric acid as the embrittling agent results in a significant amount of chlorine in the powdered fuel recovered from the process. Hydrochloric acid causes corrosion problems, during the embrittlement process as well as during the burning of the powdered fuel derived from the hydrochloric acid embrittlement process. In order to use the above powdered fuels, additional treatment of the fuel to remove sulphur or chlorine is required prior to or during the combustion process to prevent these undesirables from entering the environment. These additional requirements, of course, decrease the value of the solid fuel made by the process described in the above patents.

Another reference which suggests the use of chemical embrittling agents to facilitate the conversion of the solid organic fraction of municipal solid waste into a powdered fuel is EPA-600/7-78-143, entitled Investigation of Advanced Thermal-Chemical Concepts for Obtaining Improved MSW-Derived Products. The authors in this report tested formaldehyde, hydrochloric acid, chlorine, sulphur dioxide, etc. as chemical embrittling agents. While the authors acknowledged that formaldehyde was an aid to embrittlement, their results suggest that it was not in and of itself a sufficiently effective agent to be used alone. This is evidenced by the fact that 10 of 11 experiments reported by the authors involved the use of a second reagent in combination with the formaldehyde and by the fact that 1 hour ball milling was required to obtain a powdered fuel. Furthermore, one experiment involving the use of formic acid with formaldehyde showed "no effect" as an embrittling agent for newsprint. Finally, the authors did not disclose the particle size of the powdered fuel which they obtained.

The above problems with the prior art processes for preparing powdered solid fuel from municipal and other waste sources are overcome by the method of the instant invention.

BRIEF SUMMARY OF THE INVENTION

The instant invention relates to a method of converting the solid organic fraction of waste into a powdered fuel which comprises heating said solid organic fraction in the presence of formaldehyde for a time and at a temperature sufficient to embrittle said solid organic fraction, comminuting said embrittled solid organic fraction to a powder which is less than a predetermined particle size and recovering said powder for use as a fuel. The solid organic fraction is thereby converted to a densified, easily storable fuel product by the method of the instant invention.

The method of the instant invention is suitable for converting any waste from whatever source, provided such waste has a significant cellulosic fraction. Thus, municipal solid wastes, industrial wastes, agricultural wastes, etc., can be treated by the method of the instant invention provided an economically significant fraction of such waste is cellulosic in nature. Other organic fractions may be present in the waste, such as plastic, rubber, fat, oil, manure, etc., and will contribute to the heating value of the powder fuel recovered from the waste. However, it is believed that the cellulosic fraction is most significantly affected by the method of this invention.

BRIEF DESCRIPTION OF THE FIGURE

The FIGURE describes a flow scheme for the preferred embodiment of the method of the instant invention.

DETAILED DESCRIPTION

The solid organic fraction may be treated by the method of this invention either after or prior to separation from the remaining waste. For example, after shredding, the organic fraction of the waste might be removed from other components by processes known in the art such as air classification, etc. The solid organic fraction may then be embrittled by the method of this invention and ground into a powder. Alternatively, the shredded waste can be treated by the method of this invention whereby the organic fraction is embrittled and the shredded inorganics in the waste can function as a comminuting aid prior to their separation from the organic fraction.

The embrittlement process of this invention requires the presence of formaldehyde in any convenient form. For example, formaldehyde may be provided as a gas, in an aqueous solution, or as a solid (para formaldehyde).

The dosage of formaldehyde may range from 0.1% to 10% by weight, preferably from 0.1% to 2%. Dosage shall be defined for the purposes of this specification as weight parts formaldehyde per 100 weight parts of the dried solid organic fraction, expressed as a percentage. While the temperature of embrittlement will vary with the dosage of formaldehyde and the nature of the solid waste being embrittled, a temperature of at least 125° C. is required. Optimum temperatures for the embrittlement process at any given formaldehyde dosage can be determined in a limited number of experiments by those skilled in the art.

The time required for such embrittlement will also be relative to the formaldehyde dosage as well as the nature of the solid waste. In addition, the time will be related to the temperature of embrittlement as will be appreciated by those skilled in the art. Preferably, because of economics, the time for embrittlement will be less than one (1) hour.

The embrittlement process of the instant invention may be carried out under any atmosphere. The oxygen partial pressure should be insufficient to cause an explosion or to allow significant combustion of the organic fraction of solid waste. Preferably less than 10% oxygen will be present during the embrittlement reaction. Suitable atmospheres include $CO_2$, $N_2$, $CO$, $H_2$, $H_2O$, etc. For the sake of economy and safety, the embrittlement process may be carried out under an atmosphere generated by a "state of the art" inert gas generator.

The embrittlement process of the instant invention may be carried out in any of the known devices used in municipal solid waste treating. For example, since the embrittled solid waste must be comminuted to less than a predetermined particle size, the embrittlement step can be carried out simultaneously with comminution in any suitable device, or alternatively, the solid waste could be embrittled prior to comminution. It will be appreciated that the embrittlement process will be carried out to the extent suitable for comminuting the embrittled solid organic fraction with a minimum expenditure of energy. It is desirable to recover a solid fuel powder having an average particle size of less than 10 mesh; more preferably less than 20 mesh (Standard Tyler Screen Scale). Therefore, the comminution will be carried out until at least a substantial portion of the embrittled solid organic fraction is less than said predetermined particle size. The partially comminuted powder can be treated to remove particles having greater particle size and the oversized particles returned to the embrittlement step. Alternatively, comminution can be continued until substantially all of the embrittled solid waste is below the predetermined limit.

The recovered powdered fuel can be burned in its powder form or it may be pelletized either by compression (with or without the use of binders such as starch, etc.) Alternatively, the powder can be slurried with an oil and such slurry utilized as a fuel. In any event, by means of the method of the instant invention, the solid organic fraction of the waste will be densified, and therefore, of a much decreased volume. Of course, a densified material is more easily handled. Furthermore, in the densified state the solid organic waste is more economical to store. The objective of this invention is to provide this densified, easily stored material without significant loss of the heating value of the solid organic fraction. In the instant process, the embrittlement conditions are maintained so that no pyrolysis or substantial decomposition occurs, i.e. dry weight loss is held to a minimum, so that preferably less than 10% of the heating value of the solid organic fraction is lost in the conversion to powdered fuel.

DESCRIPTION OF THE PREFERRED EMBODIMENT

The FIGURE shows a complete scheme to process municipal solid waste (MSW) into valuable materials, which scheme includes the conversion of the solid organic fraction of MSW into a powdered fuel by the instant novel embrittling method. There is provided a waste collection storage and transfer area where dump trucks (11) or similar refuse transport units are continuously employed to deposit municipal solid waste for processing and recovery of the valuable materials contained therein.

After the removal of the oversized bulky waste, e.g. refrigerators, etc., the MSW may be dumped directly on to a conveyor (not shown) for transfer to the primary shredder 12. The primary shredder may be a ring grinder, attrition mill, impact mill, hammer mill or the like. A hammer mill is preferred for shredding efficiency and relatively low maintenance requirements.

The shredder comminutes the waste independent of its makeup to a size suitable for classification into a predominantly organic and inorganic fraction. Approximately 80% or more of the feed to the primary shredder is comminuted to a size of about 4 inches or less.

The comminuted MSW is conveyed to a magnetic separator 13 wherein a predominantly ferrous metal fraction consisting of materials, such as shredded tin cans and the like are removed from the waste. The remaining ferrous metal-free, comminuted waste is transferred to an air-classifier 14 by suitable conveying means. In the air-classifier, a separation of the light organic fraction from the heavy inorganic fraction is obtained. As shown the air-classifier provides a zig-zag path for particles and air flow. The purpose is to impart a stop-start tumbling process to particles with many different exposures to upwardly flowing air and the downward force of gravity. The end result is the elutriation of the organic fraction fed to the air-classifier. The elutriated organic fraction is transported to the dryer 15 by conveyor means. The heavy inorganic fraction from the air-classifier may be subjected to further comminution (comminution means not shown in FIGURE) prior to sending such inorganic fraction to a trommel screen 16, wherein the smaller particle fraction is removed therefrom.

At the trommel screen the heavy inorganic fraction is separated into essentially two separate fractions. The large particle fraction, for example, in the range of from about 0.5 inches to about 3 or 4 inches contains a proportionally high percentage of aluminum and is therefor transferred to eddy-current separator 17 which separates non-ferrous metals, namely aluminum, for sale. A suitable eddy-current separator is described in U.S. Pat. No. 3,950,661 hereby incorporated by reference for that purpose. The small particle fraction, from the trommel screen, that is, the fraction that is 0.5 inches and less, is rich in glass and is conveyed to the glass recovery operation described further below.

The elutriated organic fraction from the air-classifier is sent to dryer 15, wherein it is treated at a suficient temperature in the presence of a dry gas, to reduce the moisture content of such fraction. The elutriated organic fraction preferably comprises at least 85% by weight organic materials on a dry basis and the remainder is finely divided inorganics such as glass. Drying may be carried out by either direct or indirect heating in equipment known in the art. For example, flue gas can be passed through the organic fraction in a drum dryer. Upon exiting the dryer, preferably the moisture content of such organic fraction will be less than about 10% by weight. The dry organic fraction exiting dryer 15 is conveyed to a screen 18 to separate larger organic particles from any residual recoverable inorganic constituent such as glass, which may have eluded classification in the air classifier 14. Since the density of inorganic particles typically is greater than the density of the organic particles, any inorganics carried overhead in the air classifier tend to be smaller than the organics carried overhead. Therefore, predominantly inorganic particles fall through screen 18. The oversized materials from screen 18 are sent to the embrittling reactor 19 further described below.

The finely divided inorganics falling through screen 18 are conveyed to an air table 20, wherein glass is separated from other inorganics to facilitate the recovery of the glass in the froth flotation unit described below. A typical air table, also referred to as a gravity separator, comprises a perforated platform with a series of riffles running lengthwise. The platform can be inclined in a single plane or in two planes. In operation, the inorganics are placed on the high point of the platform and the platform is vibrated in two directions. In one direction the vibrator has high acceleration and in the other direction a lower acceleration.

Air is blown through the perforations of the air table by a blower (not shown) which gives the inorganics a slight lift. The lighter material which is about 40% or more glass, generally jumps the riffles and falls off the side of the table opposite the heavier material, which follows the riffles along the length of the table and falls off into a reject bin. This reject may be used for landfill.

The glass is conveyed to a froth-flotation unit 21, preferably after slurrying with water. As shown the glass recovered from the air table may be admixed with the small particle fraction from the trommel screen 16 prior to treatment in the froth-flotation unit 21. Methods for froth-flotation of glass collected from a municipal solid waste treating process are known in the art and they are not described further herein. A suitable method of recovering the glass fraction by roth flotation is disclosed in U.S. Pat. No. 4,077,847, hereby incorporated by reference.

The oversize materials from the screen 18 are conveyed to embrittling reactor 19 by any suitable conveying means. Embrittling reactor 19 may be a rotary drum drier or other means known in the art for providing heat to a finely divided organic material. Means for providing formaldehyde in the gaseous, solid or liquid state, are also associated with said embrittling reactor. The reaction takes place at a temperature of at least 125° C., preferably from about 150° C. to 250° C., in the presence of a dosage of at least 0.1% formaldehyde. The residence time in the embrittling reactor is generally 20 to 40 minutes. The embrittled material is conveyed from reactor 19 to comminution apparatus 22 which may be, for example a ball mill, an attrition mill, a hammer mill, etc. Of course, the embrittling and comminution can take place in a single unit as will be appreciated by those skilled in the art.

The embrittled material is comminuted until at least 25 weight % of the embrittled material has a particle size of less than 10 mesh. The comminuted material is conveyed to a screen 23 wherein the oversized particles are removed and sent back through the embrittling reactor. Particles which pass through the screen are recovered as a powdered fuel.

Example

Three experimental runs were made to demonstrate the enhanced embrittlement of MSW in the presence of formaldehyde. The feed utilized was primary shred from a typical municipal waste treatment plant, from which ferrous metals, aluminum and glass present in MSW had been substantially removed. (That is, the feed was representative of the material which would be fed to embrittling reactor 19 of the FIGURE). 170 grams of feed and sufficient water to increase the moisture content of the feed to 13.4% by weight were placed in a bench scale autoclave. Formaldehye was added as an aqueous solution, therefore, the moisture was provided by such solution.

The autoclave was inerted with nitrogen before sealing. The sealed autoclave was rapidly heated in a first heated sand bath which was held at a temperature of about 300° C., until the autoclave reached a temperature of about 150° C., and then placed in a second heated sand bath which is held at a temperature of about 175° C. The second heated sand bath brought the autoclave more slowly to a temperature of about 175° C. The autoclave was held at such temperature for about 32 minutes with venting to reduce pressure buildup. The autoclave was then cooled to room temperature and the embrittled feed was removed and ground for 10 minutes in a ball mill. In the first run no formaldehyde was added and 40% by weight of the feed (on a dry basis) passed through a 20 mesh screen after ball milling.

In the second run, the same procedure was followed. The feed had 13.63% moisture and a 2.4% dosage of formaldehyde on a dry feed basis. The autoclave temperature immediately rose to about 210° C. when placed in the second sand bath. The temperature then dropped and leveled off at about 175° C. The autoclave as held in the second heated sand bath for a 28 minute period in all. 46% of dry feed passed through the 20 mesh screen after grinding in the same manner as described above.

In the third run the feed contained 13.4% moisture and a 2.2% dosage of formaldehyde. The reactor was moved to the second sand bath when it reached a temperature of 135° C. The temperature overshot to 205° C. and then stabilized at 175° C. Again the autoclave was held in the second heated sand bath for about 28 minutes in all.

After grinding as described above, 50% of dry feed passed through the 20 mesh screen.

When comparing the runs, it was apparent that the temperature rise in the autoclave above the temperature of the second sand bath indicated an exothermic reaction took place in the presence of formaldehyde.

The temperature rise of the two runs in the presence of formaldehyde was 60° to 70° C. after the autoclave was moved to the second heated sand bath. This showed that the heat of reaction was about the same and it is theorized that the reaction began immediately after the moisture was driven off at 100° C.

The increased powdered fuel yield with formaldehyde indicates that embrittling in the presence of formaldehyde improves the conversion of MSW into a powdered fuel.

I claim:

1. A method of converting the solid organic fraction of waste into a powdered fuel which comprises heating said solid organic fraction in the presence of formaldehyde for a time and at a temperature sufficient to embrittle said solid organic fraction, comminuting said embrittled solid organic fraction to a powder having a predetermined particle size, and recovering said powder.

2. The method of claim 1 wherein the formaldehyde is present in a dosage of from 0.1% to 10% weight.

3. The method of claim 2 wherein the heating takes place at a temperature of at least 125° C.

4. The method of claim 3 wherein a substantial fraction of said embrittled solid organic fraction is comminuted to a particle size of less than 10 mesh.

5. The method of claim 4 wherein said fraction having a particle size of less than 10 mesh is recovered by screening said comminuted, embrittled solid organic fraction.

6. The method of claim 5 wherein said embrittlement is carried out under an atmosphere incapable of allowing substantial combustion of the solid organic fraction.

7. The method of claim 1 wherein said solid organic fraction is separated from the waste prior to embrittling.

8. The method of claim 1 wherein said embrittlement is carried out at conditions whereby the loss of heating value in the conversion of said solid organic fraction into powdered fuel is less than 10%.

9. The method of claim 1 wherein the heating takes place at a temperature of from about 150° C. to about 250° C.

10. A method for separating municipal solid waste (MSW), comprising an inorganic fraction; including glass, ferrous metals and aluminum; and a solid organic fraction, into valuable materials which comprises:

(a) shredding the MSW to provide a comminuted MSW;

(b) separating a ferrous metal fraction from said comminuted MSW and recovering a substantially ferrous metal-free fraction;

(c) subjecting said substantially ferrous metal-free fraction to air-classification to separate a solid organic fraction overhead, and leave an inorganic fraction, which includes glass and aluminum;

(d) comminuting said inorganic fraction to provide an aluminum-rich fraction having a particle size greater than 0.5 inches and a glass-rich fraction having a particle size of less than 0.5 inches;

(e) separating such aluminum-rich fraction from said glass-rich fraction;

(f) recovering glass from said glass-rich fraction;

(g) recovering aluminum from said aluminum-rich fraction;

(h) heating said separated solid organic fraction in the presence of formaldehyde for a time and at a temperature sufficient to embrittle said separated solid organic fraction;

(i) comminuting said embrittled solid organic fraction to a powder having a predetermined particle size; and (j) recovering said powder.

11. The method of claim 10 wherein the formaldehyde is present in a dosage of from 0.1% to 10% weight.

12. The method of claim 11 wherein the heating takes place at a temperature of at least 125° C.

13. The method of claim 12 wherein a substantial fraction of said embrittled solid organic fraction is comminuted to a particle size of less than 10 mesh.

14. The method of claim 13 wherein said fraction having a particle size of less than 10 mesh is recovered by screening said comminuted, embrittled solid organic fraction.

15. The method of claim 14 wherein said embrittlement is carried out under an atmosphere incapable of allowing substantial combustion of the separated solid organic fraction.

16. The method of claim 10 wherein said heating is carried out at conditions whereby the loss of heating value in the conversion of said solid organic fraction into powdered fuel is less than 10%.

17. The method of claim 10 wherein the heating takes place at a temperature of from about 150° C. to about 250° C.

* * * * *

UNITED STATES PATENT AND TRADEMARK OFFICE
CERTIFICATE OF CORRECTION

PATENT NO. : 4,265,636
DATED : May 5, 1981
INVENTOR(S) : Theodore C. Frankiewicz It is certified that error appears in the above-identified patent and that said Letters Patent are hereby corrected as shown below:

Column 1, line 14, for "removed" read -- recovered --.
Column 1, line 49, for "surphuric" read -- sulphuric --.
Column 5, line 9, for "suficient" read -- sufficient --.
Column 5, line 59, for "roth" read -- froth --.
Column 5, line 63, for "embrittlng" read -- embrittling --.
Column 6, line 52, after "210°C" insert -- from 150°C --.

Signed and Sealed this

Twenty-eighth Day of July 1981

[SEAL]

Attest:

Attesting Officer

GERALD J. MOSSINGHOFF

Commissioner of Patents and Trademarks